Feb. 2, 1971    W. B. KIMBRELL ET AL    3,560,295
METHOD OF LINING METAL PIPE
Filed Oct. 17, 1969    7 Sheets-Sheet 2
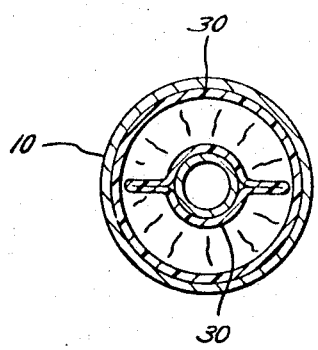
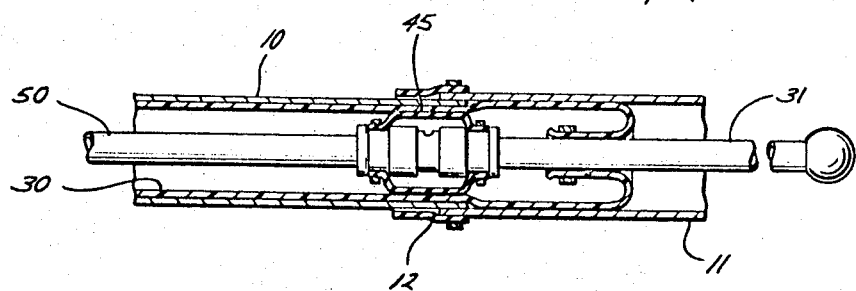
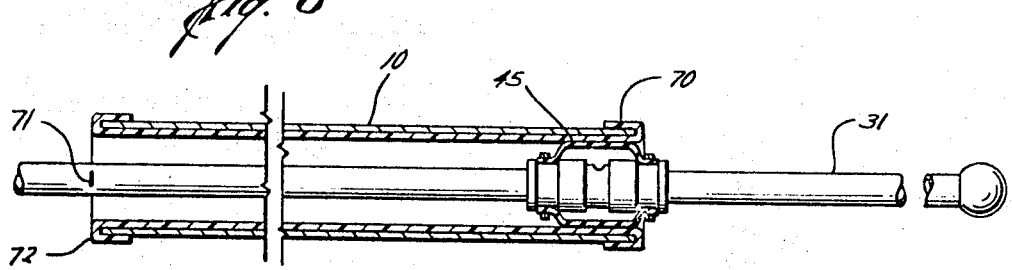
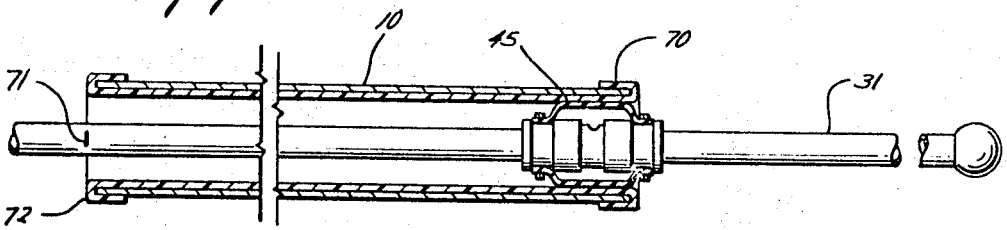
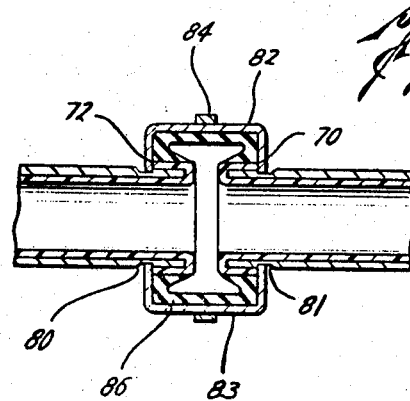
Willard B. Kimbrell
Sol B. Kimbrell
INVENTORS
BY Murray Robinson
ATTORNEY

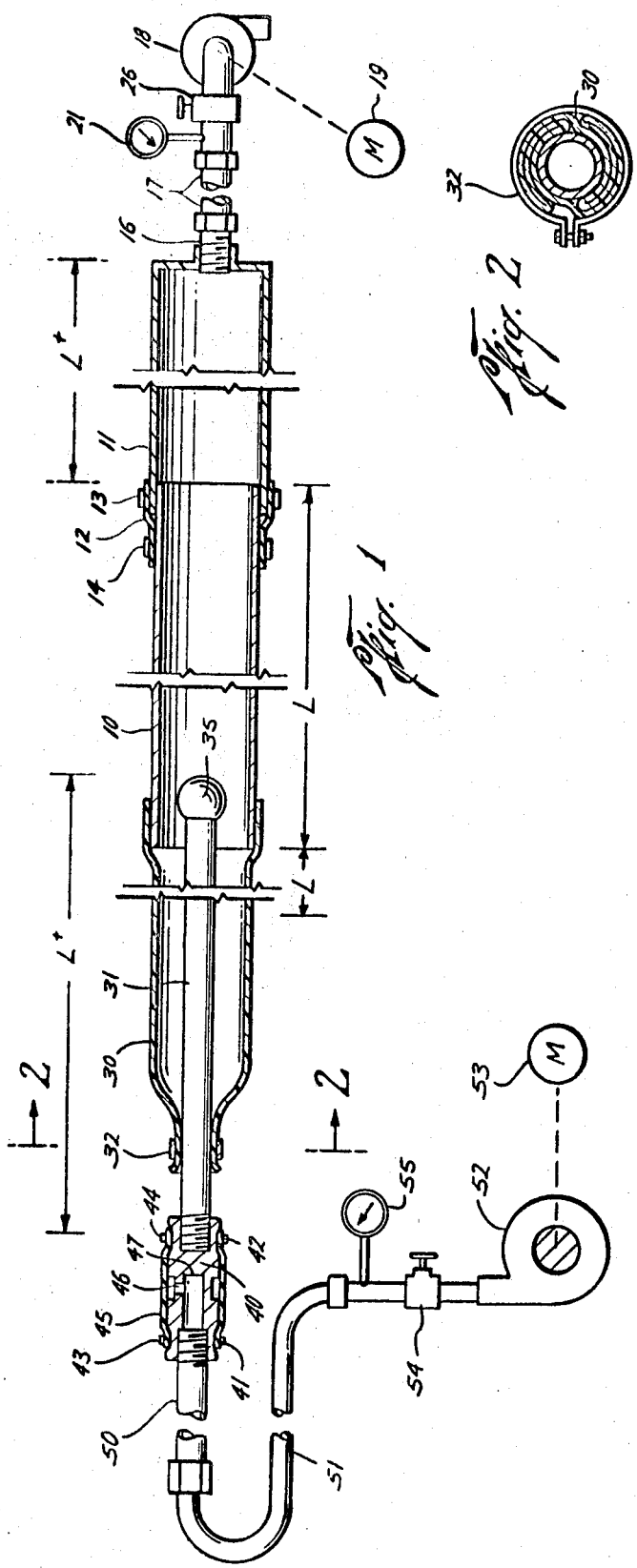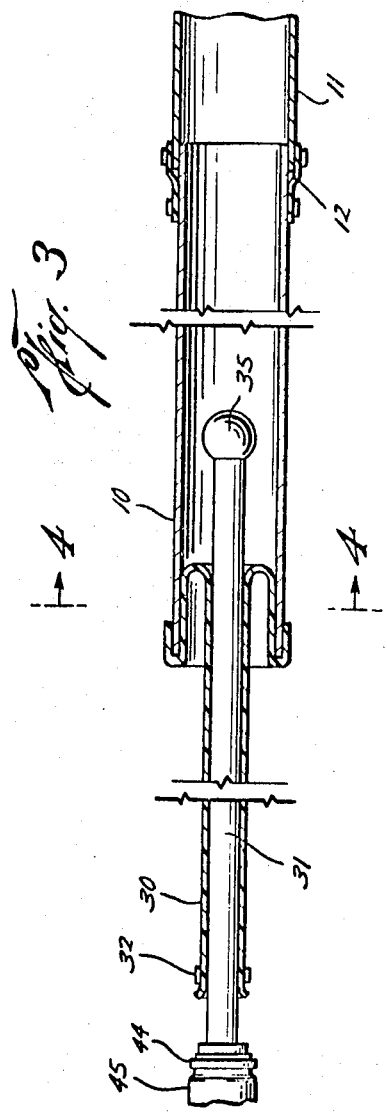
Willard B. Kimbrell
Sol B. Kimbrell
INVENTORS

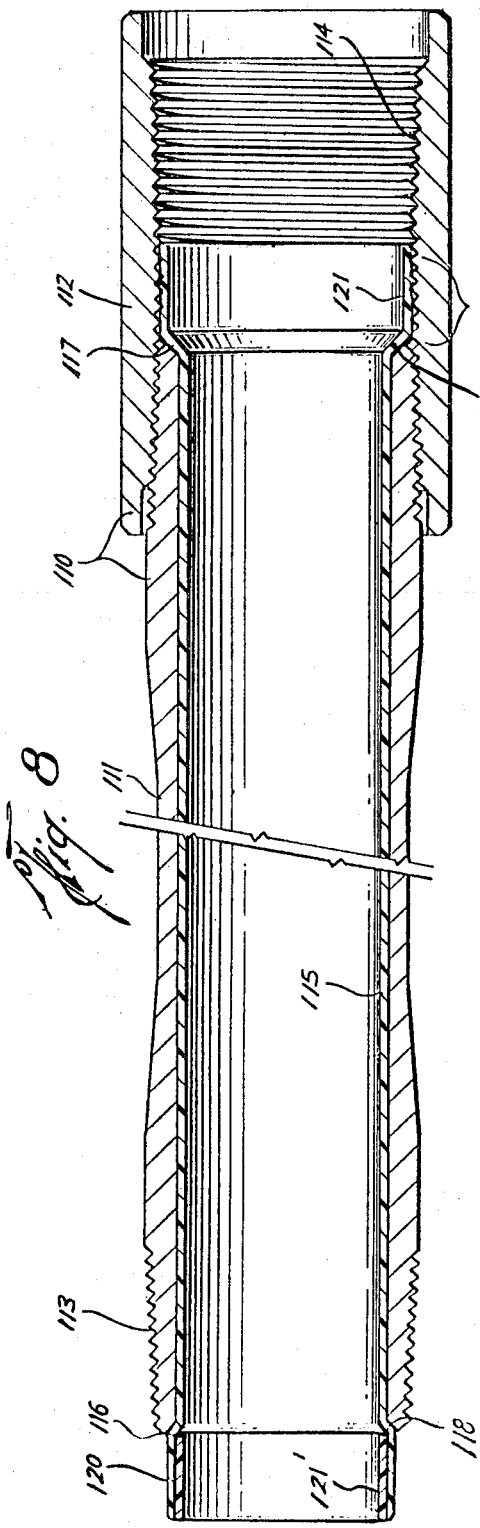
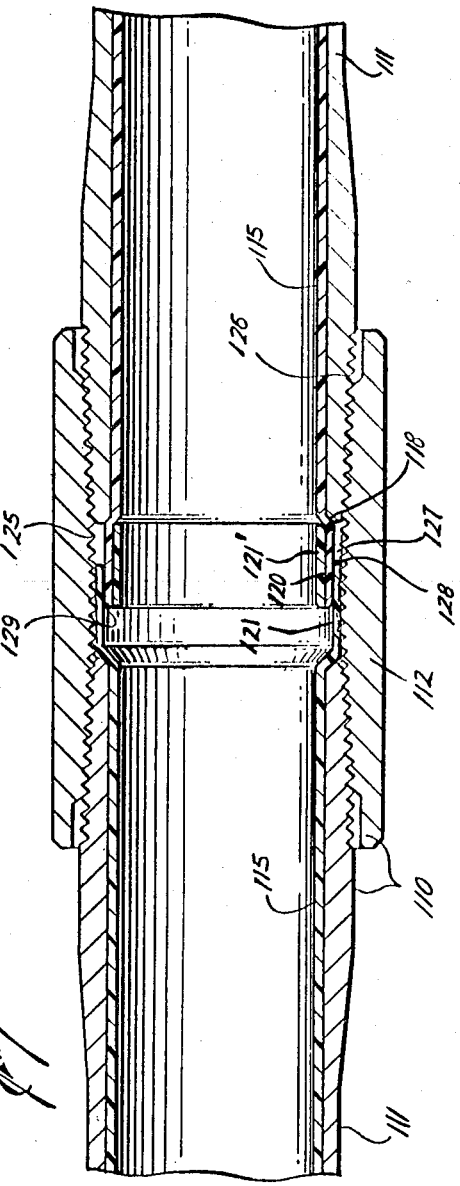

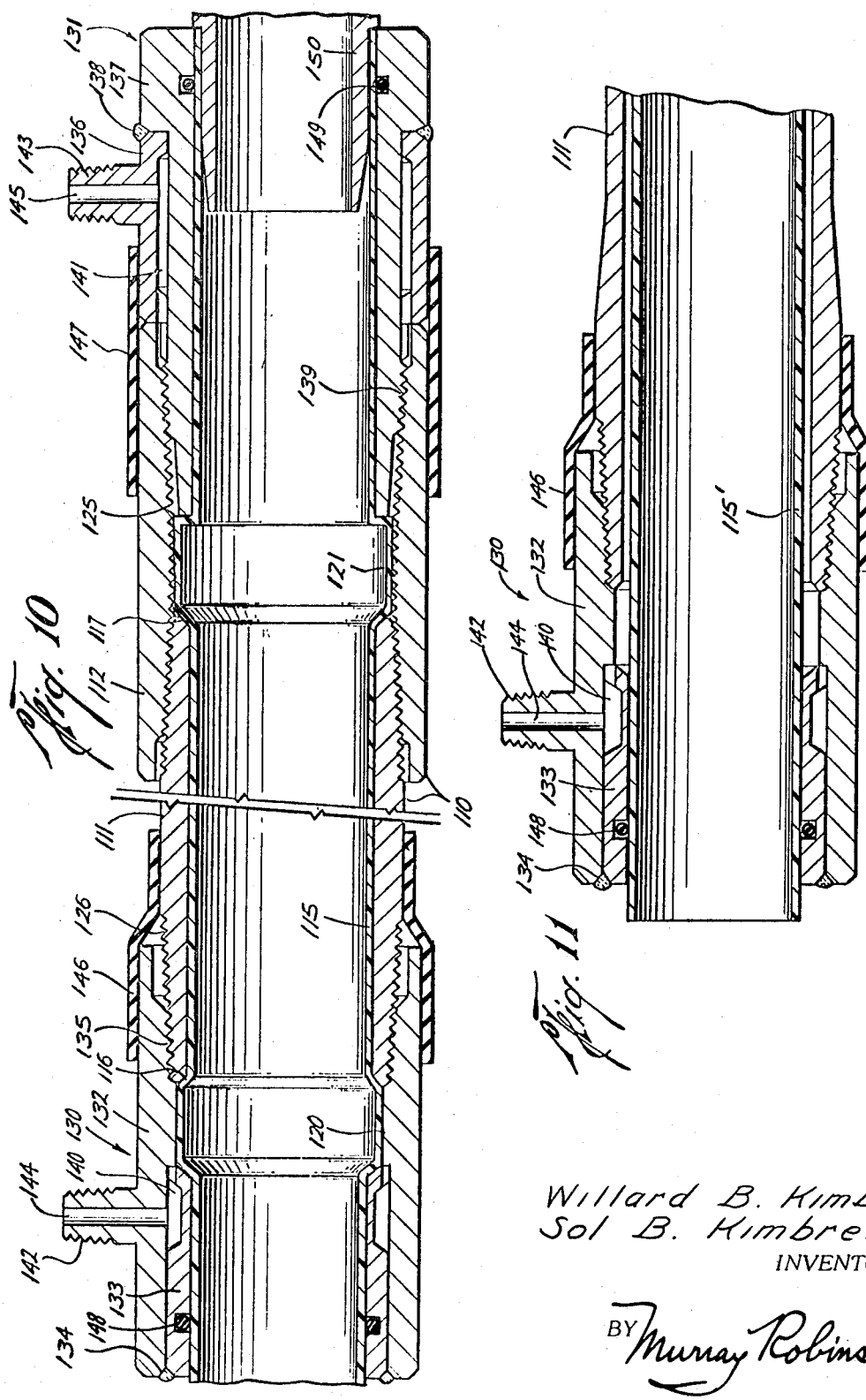

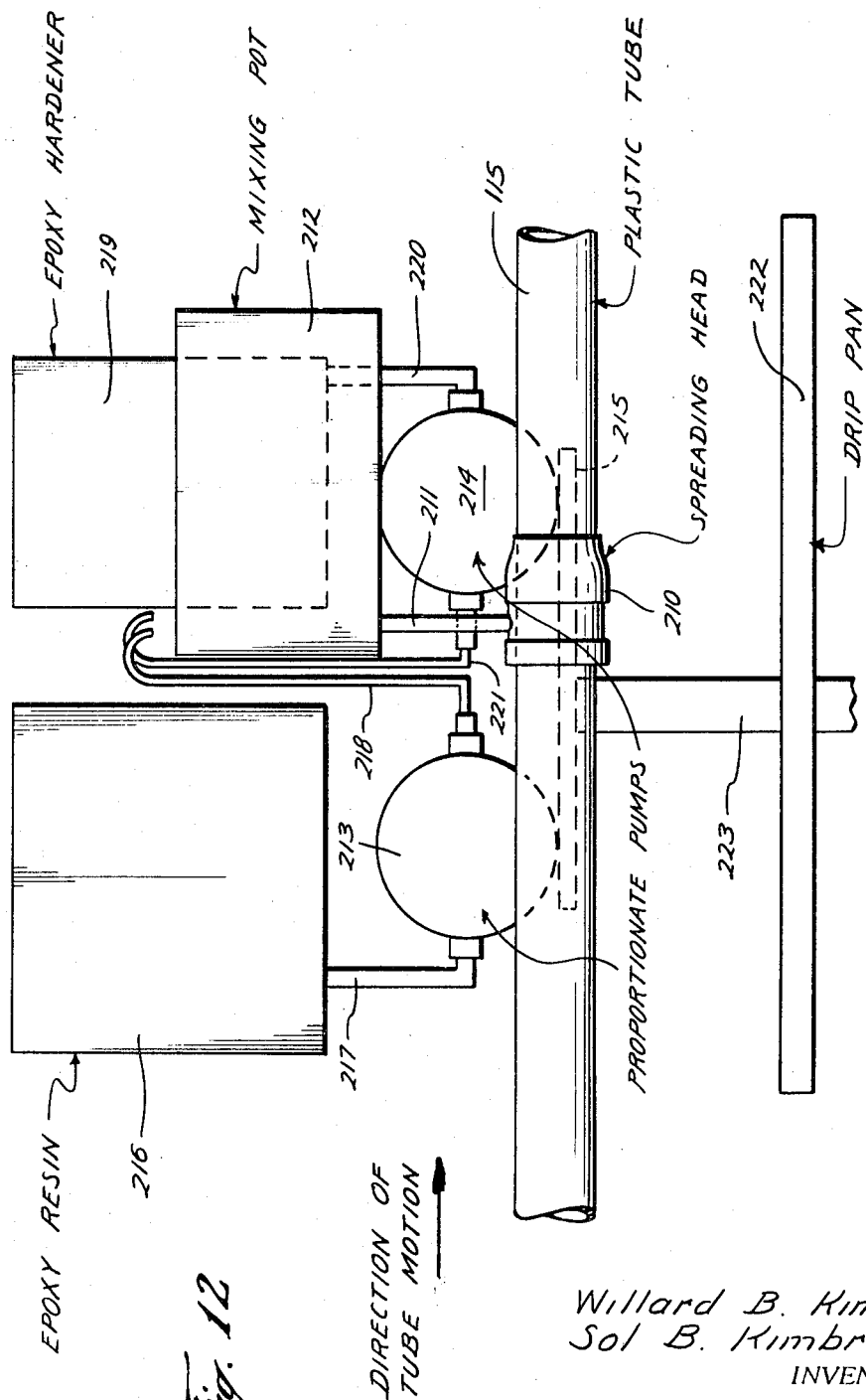

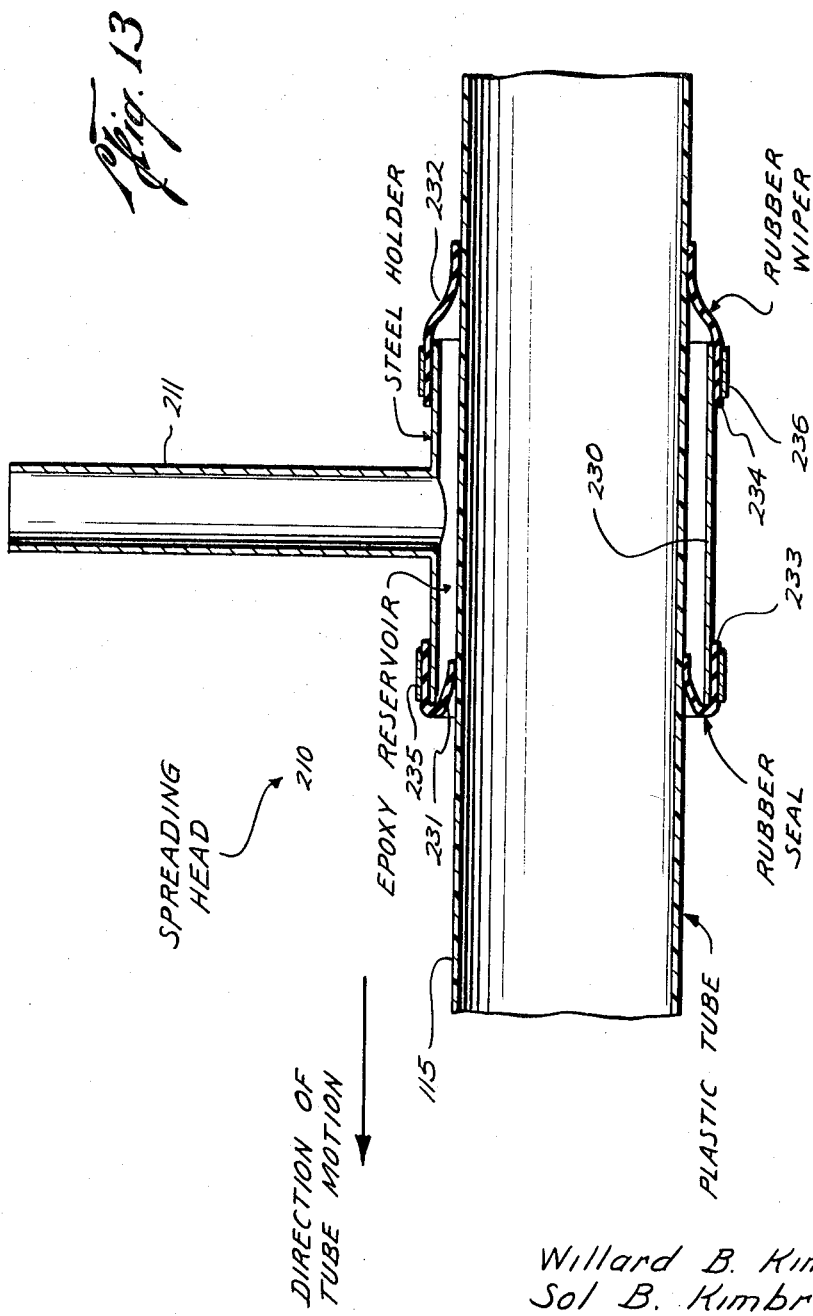

Fig. 14

United States Patent Office 3,560,295
Patented Feb. 2, 1971

3,560,295
METHOD OF LINING METAL PIPE
Willard B. Kimbrell, Wichita, and Sol B. Kimbrell, Great Bend, Kans., assignors, by mesne assignments, to The Bovaird Supply Company, Tulsa, Okla., a corporation of Delaware
Continuation of application Ser. No. 806,041, Mar. 7, 1969, which is a continuation of application Ser. No. 658,433, Aug. 4, 1967, which is a continuation-in-part of applications Ser. No. 414,989, Dec. 1, 1964, and Ser. No. 550,869, May 17, 1966, which in turn is a division of abandoned application Ser. No. 272,262, Apr. 11, 1963. This application Oct. 17, 1969, Ser. No. 867,416
Int. Cl. B29c *17/07;* B32b *31/04*
U.S. Cl. 156—287                                 3 Claims

ABSTRACT OF THE DISCLOSURE

A method of lining metal pipe with a tube of rigid thermal-plastic material having an outer diameter slightly smaller than the inner diameter of the pipe. The tube is coated with an epoxy cement and inserted axially into the pipe. Air is withdrawn from the space between the pipe and the tube to create a vacuum in this space. Hot oil at a temperature of about 285 degrees Fahrenheit is then flowed through the tube starting from one end of the tube at an inlet pressure of 1–5 pounds per square inch and discharging out the other end of the tube to atmospheric pressure for a time long enough to raise the temperature of the tube progressively from the oil inlet end of the tube to the oil outlet end of the tube to change the state of the tube from rigid to plastic. The vacuum causes the tube to expand outwardly progressively from one end of the pipe to the other as it is changed to a plastic state by the oil and the progressive expansion causes residual air to be squeezed out from between the tube and pipe. The vacuum is maintained while the formed tube is cooled, the tube being cemented to the pipe by the epoxy cement. A swab may be pushed through the cooled tube and pipe to further cool the tube and to remove oil adhering to the inside of the tube.

CROSS REFERENCES TO RELATED APPLICATIONS

This application is a continuation of our prior copending application Ser. No. 806,041 filed Mar. 7, 1969, entitled "Pipe Lining," now abandoned, which in turn was a continuation of our prior application Ser. No. 658,433 filed Aug. 4, 1967 entitled "Pipe Lining," now abandoned, which in turn was a continuation-in-part of our prior application Ser. No. 414,989 filed Dec. 1, 1964, entitled "Lined Pipe and Method" now abandoned, and of our prior application Ser. No. 550,869 filed May 17, 1966, entitled "Lined Pipe and Method and Apparatus for Making Same," now abandoned, which was a division of prior application Ser. No. 272,262 filed Apr. 11, 1963, entitled "Lined Pipe and Methods and Apparatus for Making Same," which was copending with said Ser. No. 550,869 and was abandoned in favor thereof, Ser. No. 551,807 filed May 20, 1966 entitled "Lined Pipe and Method and Apparatus for Making Same," now abandoned, also being a division of said Ser. No. 272,262.

BACKGROUND OF THE INVENTION (1) Field of the invention

This invention pertains to fluid conduit and apparatus and method for making same. More particularly, this invention pertains to method of lining pipe and to improved conduit which may be made by the method.

(2) Description of the prior art

It has heretofore been disclosed that a pipe may be lined with a tube having a normal outer diameter smaller than the inner diameter of the pipe by expanding the liner into contact with the pipe by means of fluid pressure differential. It is to this type of pipe lining that the present invention pertains.

In any method of pipe lining involving a step of expanding a liner tube into contact with the pipe, there exists the problem of preventing entrapment of air between the tube and pipe, such entrapment causing blisters on the interior of the pipe. To prevent this it has been taught that a vacuum should be applied to the annulus. However, there remains a difficulty even if the annulus is connected to a vacuum through a vent pipe, since the liner tube tends to seal over the vent holes.

SUMMARY OF THE INVENTION

The object of one form of the invention is to provide a more durable, less expensive, lighter weight fluid conduit than has heretofore been available.

According to the invention there is provided a fluid conduit comprising a thin walled metal pipe protected against corrosion by coating the interior with pressure sensitive cement and reversing a plasticized plastics material lining tube onto the inside of the pipe under a vacuum.

The resultant vacuum and cement adhered plasticized lining remains in contact with the pipe and remains imperforate despite stresses imposed by temperature change, flexure, or other cause, thereby assuring that the lining continues to serve its primary function of protecting the pipe against corrosion and decreasing the resistance to fluid flow through the pipe.

A feature of the apparatus used in the invention is the director mandrel used to control the liner tube while it is being reversed. It includes a lead rod having a guide ball at one end adapted to be inserted into one end of the pipe, one end of the liner tube being stretched over that end of the pipe and the other end of the liner tube being sealed to the root of the lead rod. When a vacuum is applied to the other end of the pipe, the liner tube is collapsed into a flat ribbon except where it lies against the lead rod. Advancing the lead rod into the pipe causes the liner tube to reverse and adhere against the pipe. The lead rod prevents improper reversing of the liner tube which might otherwise bridge across the pipe and cease to reverse.

A further feature of the apparatus of the invention is the pressure plug forming a part of the director mandrel midway of the length thereof between the aforementioned lead rod and a tailpipe extending rearwardly therefrom to a source of air pressure. When the lead rod has been pushed all the way through the pipe and the liner tube adhered to full length of the pipe, the pressure plug will be adjacent the end of the pipe. The plug is inflated to press the liner tube against the end of the pipe and turned back forming a cuff similar to that formed at the beginning of the process at the other end of the pipe. The exterior of the pipe is also coated with pressure sensitive cement at both ends to retain the cuffs. Back of the cuffs the pipe may be provided at each end with means such as an annular groove for engagement with a pipe coupling.

The objects of the invention in another form thereof are to provide a satisfactory method of lining pipe with rigid plastics material such as PVC (poly vinyl chloride) and to provide an improved conduit construction which can be economically manufactured, which will be satisfactory in service, and lengths of which can be readily coupled and uncoupled. Such conduit is especially useful for oil well tubing, being highly resistant to corrosion and analogous forms of deterioration.

According to the invention a slightly undersized rigid tube of thermoplastic material such as PVC is inserted into a pipe, following which the tube is rendered plastic by heat and is expanded by fluid pressure into engagement with the pipe. After being thus sized to fit the pipe, the tube is brought back to a rigid state by reducing its temperature. The fluid pressure is created by drawing a vacuum between the tube and pipe. The heating is accomplished by flowing hot oil through the tube. Temperature reduction is accomplished by discontinuing the flow of hot oil. In order to facilitate the vacuum procedure, tubular extension means are connected to the ends of the pipe in sealing engagement with the pipe and tube, air being withdrawn from the annulus between pipe and tube through passages in the extension means. To facilitate the hot oil procedure, a tubular connector is inserted into one end of the tube in sealing engagement therewith and through the connector the hot oil is introduced into the tube.

The resulting conduit is free of air pockets between pipe and tube, so that there is no protuberant nor unsupported portion of the tube that would be likely to break open and expose the pipe to fluid flowing in the conduit. During expansion of the tube it moves out over the pin end of the pipe and over the bottom of the socket at the socket end of the pipe, thereby interlocking the tube and pipe axially to prevent retraction of the tube ends into the pipe. At the pin end of the conduit the tube extends a short way beyond the end of the pipe providing a spigot adapted to telescope within a bell at the end of the tube at the socket end of another conduit and form a seal when lengths of conduit are connected end to end.

According to a modification of this second form of the invention, the tube is coated with epoxy cement before it is inserted into the pipe. The cement sets while the conduit is cooling. The use of this cement makes it unnecessary to leave flanges on the tube at the ends of the pipe, so that all the excess tubing beyond the ends of the pipe is cut off. A special seal is placed in the coupling, the seal comprising a steel sleeve fitting closely inside the coupling and of a length adapted to engage the ends of the pipe. A rubber boot is vulcanized to the inside of the steel sleeve and, being longer than the sleeve, extends beyond the ends thereof, overlapping and sealing with the ends of the liner tubes of the coupled conduits.

A feature of both forms of the invention is that while a vacuum is being applied to the space between the pipe and liner, the liner is progressively expanded outwardly toward the pipe starting at one end of the pipe and moving gradually to the other end. In the first form of the invention this is accomplished by the gradual movement of the lead rod into the pipe, the flexible liner peeling off the guide rod, turning inside out, and progressively expanding out toward the pipe. In the second form of the invention the liner is gradually transformed from a rigid state to a plastic state progressing from one end of the pipe to the other by the progressive heating of the liner tube by hot oil flowing therethrough. The annulus is connected to the vacuum through port means adjacent the end of the pipe last to support the outwardly expanding liner tube, so that the vacuum remains effective until the progressive expansion is completed.

For a more detailed description of preferred embodiments of the invention reference will now be made to the accompanying drawings.

BRIEF DESCRIPTION OF THE DRAWINGS

FIG. 1 is a side elevation, largely in section and partly schematic, showing a pipe about to be lined according to the method of the invention with apparatus according to the invention;

FIG. 2 is a section taken at 2—2 of FIG. 1;

FIG. 3 is a view similar to FIG. 1 showing a later stage in the method;

FIG. 4 is a section taken at 4—4 of FIG. 3;

FIG. 5 is a view similar to FIG. 3 showing a later stage in the method;

FIG. 6 is a view similar to FIG. 3 showing a terminal stage in the method, and depicting the finished lined pipe;

FIG. 7 is an axial section showing a suitable means for coupling pipes made in accordance with the invention;

FIG. 8 is an axial section through a length of conduit embodying the invention according to a second embodiment thereof;

FIG. 9 is a view similar to FIG. 8 showing the ends of two lengths of the conduit connected together;

FIG. 10 is an axial section through the conduit, including pipe and lining tube, and showing also the associated equipment used in lining the pipe according to the second form of the invention;

FIG. 11 is a view of one end of the conduit and associated equipment shown in FIG. 3 and showing the tube in its initial condition prior to expansion thereof;

FIG. 12 is a schematic side elevation of apparatus useful in a modified form of the second embodiment of the invention;

FIG. 13 is a scale vertical section through the spreading head portion of the apparatus shown in FIG. 12; and FIG. 14 is a fragmentary axial section through a coupling suitable for connecting lengths of pipe in accordance with the invention.

DESCRIPTION OF THE PREFERRED EMBODIMENTS

(a) First form of the invention

Referring now to FIG. 1, there is shown a steel pipe 10. The pipe may be of any length, e.g. 25 feet. It will usually be a thin walled pipe, e.g. .083 inch in thickness. The diameter of the pipe is variable, a 2⅜" diameter pipe is typical but larger and smaller pipes may be used.

To the right hand end of the pipe is connected a casing 11. The left end of the casing is telescoped part way over the right hand end of the pipe and suitably sealed thereto. For example, the casing may be provided with a rubber sleeve 12 secured at one end to the casing by a hose clamp 13. The other end of the sleeve is releasably secured to the pipe by another hose clamp 14. The right end of the casing is connected, e.g. welded, to a flange 15 having a central nipple 16 to which a hose 17 is connected. The hose is connected to the suction side of a vacuum pump 18 driven by a motor 19. A valve 26 controls the pump outlet and a gage 21 shows the pressure. A vacuum of 22 to 24 inches of mercury has been found satisfactory, the vacuum being adjusted as necessary according to the ambient temperature and size of the liner tube so as to avoid too much stretching of the liner tube which might cause wrinkles.

To the left end of pipe 10 is secured the right hand end of liner tube 30. The tube may be made of plasticized polyvinyl-chloride. Other plastics materials, including rubber, may be used if they have sufficient flexibility, elasticity, and plasticity, to allow stretching and reversing during application to the pipe and stretching and stress relief during temperature change and flexure after application to the pipe and in use. A brittle plastics material such as a formaldehyde condensation product (Bakelite) would be unsuitable, being neither plastic nor elastic. An unplasticized plastic, e.g. natural rubber would not be too suitable because of possible embrittlement at low temperatures. Also, it is not resistant to petroleum hydrocarbons (oil). At the other extreme, a plastics material having no elasticity, such as beeswax, would not be suitable because it could not be maintained in tubular form during application and might part during use. A plastics material having oil and corrosion resistance and having moderate elastic and plastic qualities such as plasticized polyvinyl-chloride is satisfactory.

Tube 30 is secured to pipe 10 by first applying pressure sensitive cement to the exterior of the pipe adjacent the end thereof and then, the tube being of smaller inner diameter than the outer diameter of the pipe, stretching the tube and slipping it over the end of the pipe as shown. Stretching the tube is facilitated by warming it.

The left end of tube 30 is secured to the root of lead rod 31 by a length of baling wire 32. Since the inner circumference of the tube is considerably less than the outer circumference of the lead rod, it is necessary to wrap the tube around the lead rod in multiple layers, e.g. as shown in FIG. 2.

The lead rod 31 is actually hollow to reduce its weight. At its forward end it is provided with a guide means in the form of a ball 35 secured thereto. The root end of the lead rod is screwed into the right hand end of the cylindrical core 40 of a pressure plug.

The core 40 has annular grooves 41, 42 around each end to receive hose clamps 43, 44. A rubber sleeve 45 around core 40 has its ends sealed to the core by the clamps 43, 44. The core 40 and sleeve 45 form a pressure plug. The core has a radial passage 46 in its side whereby air or other fluid under pressure can be admitted to the inner surface of sleeve 45 from the port 47 extending inwardly from the left end of the core.

A tail pipe 50, screwed into the left end of core 40 in communication with port 47 serves both to conduct pressure air to the pressure plug and as a handle therefor. Separate means could be provided for these functions.

A hose 51 connects the left end of the tail pipe with the outlet of an air compressor or other fluid pump 52. The air compressor is driven by motor 53. A valve 54 controls the flow from the compressor. Gage 55 shows the pressure in the line. A pressure of ten or fifteen p.s.i. is adequate.

Referring now to FIG. 3 there is shown the condition of the apparatus after the vacuum has been applied to the right hand end of the pipe and the director mandrel comprising lead rod, pressure plug, and tail pipe has been allowed (manually) to be drawn a short way into the pipe. The suction has collapsed the liner tube onto itself and the lead rod (see also FIG. 4). The tube has started to reverse itself, that is, to turn inside out.

FIG. 5 shows the status of the apparatus after the vacuum has been allowed to draw the tube all the way through the pipe and the pressure plug has been expanded against the tube at the end of the pipe to retain the tube in position. The vacuum has been shut off and the sleeve 12 released from the pipe.

The casing 11 can now be pulled away from the pipe exposing the end of the tube. The tube can then be cut off and turned back over the previously cemented end of the pipe to form a cuff 70. The resultant condition of the apparatus is shown in FIG. 6. The pressure plug may then be deflated and the director mandrel withdrawn.

FIG. 6 also shows the gage mark 71 on the tail pipe as being adjacent the cuff 72 at the left end of the pipe. This indicates to the operator that the pressure plug is even with the other end of the pipe. It is by this means that the operator can tell when the tube is all the way through the pipe so that the plug can be inflated and the vacuum removed as above described.

It is to be observed that as indicated on the drawing, the distance from the pressure plug to the gage mark equals the length "L" of the pipe, whereas the casing 11 exceeds length L to receive the lead rod which exceeds length L. If the lead rod is omitted the casing can be shortened.

Prior to lining the pipe with the liner tube, the interior of the pipe is coated with pressure sensitive cement, for example by spraying or swabbing. Therefore, when the vacuum reverses the liner tube and pulls it against the inside of the pipe, a strongly adherent bond is created. Preferably the liner tube is slightly smaller in outer diameter than the inner diameter of the pipe (e.g. 0.050") so that it is drawn into contact with the pipe without wrinkling. The liner tube material is sufficiently plastic so that it permanently assumes the contour and diameter of the inner surface of the pipe before the initial vacuum adhesion can be relieved. The tube is thus permanently held in place by both the adhesive and the pressure differential or vacuum that would be pulled by any separation of the tube and pipe; this is called hereinafter vacuum-cement adhesion and refers to the proximity of the surfaces, the adhesion, and the absence of foreign materials in the pipe-cement-tube sandwich.

Although a pressure sensitive cement has been specified because it does not set and will allow relative movement of pipe and tube as may be necessary due to the flexure of the fluid conduit or due to temperature change (the steel pipe having a quite different temperature coefficient of expansion from most plastics), it is to be understood that some of the advantages of the invention can be obtained with other cements through the vacuum adhesion process, especially if the cement is plasticized.

FIG. 7 shows the ends of two pipes lined in accordance with the invention. Annular grooves 80, 81, at the ends of the pipe just back of cuffs 70, 72 provide means to receive the longitudinally split coupling 82–83, the two halves of which are held in place by a drive ring 84. A double cup rubber packer 86 inside the coupling seals against the rubber cuffs.

It is to be noted that when one end of tube 30 is initially stretched over the left hand end of pipe 10 to form cuff 72, the cuff is placed in hoop tension, and later when the other end of the tube 30 is turned back over the end of the pipe 10 to form cuff 70 this cuff is also placed in hoop tension. The cuffs therefore provide seal means at each end of the pipe preventing air from entering between the pipe and tube and breaking the vacuum. Without such seal means the tube would gradually pull away from the pipe since despite the plasticity of the tubing some residual stress remains therein created by the expansion of the tube to the same outer diameter as the inner diameter of the pipe. The non-setting, pressure sensitive cement is not strong enough to prevent such separation of tube and pipe, for the cement is selected to allow relative movement of tube and pipe during flexure of the conduit and during change of ambient temperatures. However, so long as the seal cuffs at the ends of the pipe remain intact, the vacuum between the pipe and tube maintains the tube in pressure contact with the cemented inner surface of the pipe.

In connection with the achievement of a good vacuum bond between the tube and pipe, it is to be emphasized that as the tube turns inside out and engages the cemented interior surface of the pipe, any air therebetween is squeezed out toward the end of the pipe connected to the vacuum pump. This progressive expansion of the tube into engagement with the cemented pipe is important to prevent entrapment of residual air bubbles as can occur if the tube is simultaneously expanded along its entire length as in the prior art. The rate of travel of the progressive expansion along the pipe is controlled by how fast the operator allows the lead rod and tail pipe to be drawn into the pipe. The speed of travel is related to the capacity of the vacuum pump so as to insure that the air squeezed out is rapidly removed. As a practical matter, the operator may feed off the lead rod and tail pipe at a rate of a few feet per second.

(b) Second form of the invention

Referring next to FIG. 8, there is shown a pipe 110 comprising a length of tubing 111 externally taper threaded at both ends and coupling 112 internally taper threaded at both ends with one end of the coupling screwed on to one end of the tubing in fluid tight engagement therewith. The coupling is bucked on tight enough so that it will not easily become unscrewed, it being intended that this connection not be broken when a string of conduit is disassembled. The resultant pipe thus has an externally threaded pin end 113 and an internally threaded socket end 114. The tubing and coupling are made of rigid metal such as steel. The pipe is line with a tube 115 of rigid PVC, the resultant lined pipe forming a conduit embodying the invention. Other thermoplastic materials can be used instead of PVC, dependent on the properties such as corrosion resistance and acid resistance that are desired. A choice of materials for tube 115 may also be based on the temperature of thermoplasticity. This is especially true if the lined pipe is to be exposed to high ambient temperatures, e.g., left out in the sun on the desert or used at great depths in the earth.

The tube 115 includes at its ends outturned flanges 116 and 117 which overlap the ends 118, 119 of the tubing 111. This interlocks the pipe and tube and prevents relative axial movement. In the case of conduit made by the herein disclosed method the flanges 116 and 117 are especially important to prevent the ends of the tube from retracting within the pipe. Absent the end flanges 116 and 117, such retraction is apt to occur if the conduit is subjected to high temperature over protracted periods. This tendency of the tube to shrink away from the end of the pipe, despite the fact that the plastic has a larger temperature coefficient of expansion than the steel, is probably due to a stress left in the tubing as a result of the tube being installed while hotter than the pipe and also due to the initial expansion of the tube during installation. When the conduit becomes overheated the surface interlock between the pipe and the thermoplastic tube inside the pipe weakens and the tube tends to shrink axially.

The tube 115 includes a spigot 120 extending beyond the flange 118 and the pin end of the pipe. FIGS. 8–11 of the drawings, which are drawn to scale and to full scale, show that the spigot extends about 5/8" for this 1 7/8" O.D. conduit. The spigot is supported internally by a ring 121', also of rigid PVC. The ring is integrated (welded) to the PVC tube with a solvent. At its other end tube 115 is provided with a bell 121 adapted to receive, with a slight interference fit (e.g. about .030" on diameters) the spigot on the end of another length of similar conduit. The portion 122 of the coupling 112 which surrounds the bell 121 is made smooth so as to support the bell against internal pressure. This can be done, in the case of a coupling that has been threaded from end to end, by filling the interthread spaces at portion 122 with modeling clay prior to installing the liner tube. Preferably the clay is of a type that does not harden and remains plastic throughout the life of the conduit.

Referring now especially to FIG. 9, before making up successive lengths of the conduit, a lubricant compound or dope is applied to the thread 125 at the socket end and threads 126 at the pin end of the adjacent lengths of conduit. When the conduits are screwed together the excess compound is trapped at 127 and provides support for the part of the spigot 120 between the end 118 of the pipe and the end 128 of the liner bell. The tapered end 129 of the liner spigot on one conduit guides it initially into the liner bell of the adjacent conduit and due to the interference fit the spigot seals with the bell. Separate gaskets or other sealing means between adjacent lengths of conduit are therefore unnecessary.

Referring now to FIGS. 10 and 11 a preferred method of manufacturing the conduit will be described. The PVC liner tube is first stabbed through the pipe 110. At this time the outer diameter of the tube is slightly smaller than the inner diameter of the pipe. This is the condition of the tube shown in FIG. 11 wherein the tube prior to expansion is identified by reference number 115'. Tubular extension means 130 and 131 are then screwed on to the ends of the pipe.

The pin extension means 130 includes an outer sleeve 132 and an inner sleeve 133 welded together at 134. Outer sleeve 132 is longer than inner sleeve 133 and the part of sleeve 132 extending beyond sleeve 133 is internally threaded at 135 where it is screwed on to threads 126 at the pin end of the pipe. The socket extension means 131 includes an outer sleeve 136 and an inner sleeve 137 welded together at 138. The inner sleeve 136 is longer than outer sleeve 138 and the part of sleeve 136 extending beyond one end of sleeve 137 is externally threaded at 139 where it is screwed into the threads 125 at the socket end of the pipe. A portion of each outer sleeve is spaced from each inner sleeve leaving an annular chamber therebetween as shown at 140, 141. The outer sleeves are provided with externally threaded stems 142, 143 adapted for connection to vacuum lines (not shown). Ports 144, 145 in the stems communicate with chambers 140, 141. Chamber 140 opens at one end to the annulus between tube 125' and outer sleeve 132. Chamber 141 communicates at one end through the passage between threads 125 and 139 with the annulus between tube 115' and coupling 112.

The outer sleeves are sealed to the ends of pipe 110 with rubber boots 146, 147, wired or otherwise secured in place on the sleeves and pipe. The inner sleeves are sealed to the tube 115' by O-rings 148, 149. Because each tubular extension means seal both with the pipe and tube, it is in effect a species of equipment known as a straddle packer.

It is because it is not desired to force the tube 115' through the O-rings 148, 149, that the extension means 130, 131 are connected to the pipe 110 after the tube 115' has been placed therein. Obviously if some lip type, retractable, or other suitable seal means were used the extension means 130, 131 might just as easily be installed before the tube 115' is put in the pipe.

After the tube 115' and extension means 130, 131 have been installed in and on the pipe 110, the annulus between pipe 110 and tube 115' is evacuated of air through stems 142, 143. A tubular connector or nozzle 150 at the end of a hot oil line (not shown) is then inserted into one end of tube 115' and hot oil, e.g. at a temperature of 285° F., is caused to flow through the tube 115'. When the tube 115' heats up to the point of plasticity it expands due to the difference in pressure between the fluid (oil) inside, which is at substantially atmospheric pressure and the fluid (air) outside which has been reduced to a subatmospheric pressure. The tube 115' expands into position at 115 in intimate engagement with the inside of tubing 111 and 112, constituting the pipe 110. Also, the tube 115' expands into tubular extension means 130, 131 forming the spigot 121, bell 122, and end flanges 116, 117. The hot oil flow through the tube 115 is then discontinued, e.g. by removing the connector 150, and the oil still in the tube flows out by gravity. The metal pipe 110, which did not achieve the temperature of the hot oil during the few minutes (e.g. 5) of its flow through tube 115, quickly cools the tube 115, returning it to its rigid state; the pipe 110 itself cooling in the surrounding air. The vacuum is maintained until the tube 115 is rigid, which takes about 1 or 2 minutes. A swab is then pushed through tube 115 to remove any oil adhered thereto and to draw cool air into the tube to speed cooling. The tubular extension means 130, 131 are then removed and the tube 115 cut off to the desired length leaving the spigot 120 and bell 121 at the ends thereof. The resulting conduit is then ready for use.

Conceivably the liner tube could be expanded into place by using a hot fluid under pressure inside the tube. Advantages of the above described vacuum method over use of an internal superatmospheric pressure include the following:

(1) The vacuum removes the air between the steel pipe and plastic tube, preventing the trapping of air in pockets therebetween.

(2) Internal pressure would require some sort of seal between the oil nozzle and tube. Since the tube loses its strength and becomes soft and putty-like at the required sizing temperature (e.g. 180° F.) a pressure tight connection or seal between the nozzle and tube would be more difficult to maintain than the vacuum seal used in the preferred method.

(3) After the tube is sized with vacuum it is much easier to discontinue the flow of hot oil and maintain the vacuum during the cooling period than to substitute a cool pressure fluid for the hot pressurized oil as would be required for rapid cooling.

(4) The vacuum method is safer than a method using hot fluid under pressure.

(5) The vacuum method is more sensitive to leaks in the tube thereby facilitating the detection of defective liner tube.

Although the preferred method includes heating the tube by flowing hot oil through the tube, other methods of heating the tube to render it plastic may be used, including for example the use of gaseous fluids in place of liquid, the use of other liquids than oil, and the introduction of hot fluid without flowing it through the tube. However, if the tube is not heated with a hot fluid of high specific heat, i.e., a liquid, e.g. oil, an important advantage of the process will be lost. Reference is made to the fact that the tube heated with oil does not reach the temperature of plasticity and expand all at once along its entire length. Instead, the inlet end of the tube reaches the temperature of plasticity first and the expansion takes place first at that end. As the rest of the tube gradually reaches the temperature of plasticity, the area of expansion travels down the tube toward the oil outlet end. This causes the residual air between the pipe and tube to be squeezed out toward the downstream end of the pipe, thereby preventing entrapment of air bubbles as can occur if the tube is expanded nearly simultaneously from one end to the other. The rate of travel of the expansion should be so related to the capacity of the vacuum pump that the air is removed as fast as it is squeezed out. Even though the air outlet at the end of the pipe where oil is introduced into the tube is promptly blocked by the tube when it first expands at the oil inlet end, the air outlet at the other end remains open for the withdrawal of air until the tube has been expanded its full length. Therefore, a nearly complete removal of air between pipe and tube is effected and the two are brought close together without any blisters or wrinkles or other protuberances.

(c) Modification of second form of the invention

Instead of providing the tube 115 with outturned flanges 116, 117 to prevent relative longitudinal movement of the tube 115 and pipe 110, the tube may be cemented to the pipe. Previously, it was believed by those skilled in the art that a PVC tube could not successfully be cemented to a steel tube. However, it has been found that by using an epoxy cement the desired adhesion of tube to pipe can be achieved.

FIG. 12 shows a coating apparatus for coating the tube 115 with epoxy cement prior to stabbing the tube into the pipe. The coating apparatus comprises a spreading head 210 through which the tube 115 is pushed (or pulled) in the direction of the arrow (right to left in FIGS. 12 and 13). Preferably the spreading head is positioned coaxial with the pipe 110 with which the tube 115 is to be assembled so that the tube can be moved directly from the spreader head into the pipe in one continuous motion.

The spreading head receives cement through flow line 211 from mixing pot 212. Proportionate pumps 213, 214 supported on table 215 deliver epoxy resin and epoxy hardener to the mixing pot. The resin flows from tank 216 through flow line 217 to pump 213 and discharges into the pot through flow line 218. The hardener flows from tank 219 through flow line 220 into pump 214 and discharges into the pot through flow line 221. Excess cement falling off the tube 115 and spreading head 210 is caught in pan 222 carried by leg 223 of table 215.

The details of the spreading head are shown in FIG. 13. The flow pipe 211 discharges into a cylindrical, steel holder 230 to the ends of which are secured an annular rubber lip seal 231 and an annular rubber wiper 232. The seal and wiper have waist portions 233, 234 slipped over the ends of holder 230 and held in place by steel bands 235, 236. The lip seal 231 will retain cement inside the holder 230, and the wiper 232 will allow cement to flow gradually from the holder onto the tube 115 as the tube is moved through the spreading head. The wiper will smooth out the cement on the tube and prevent buildup of excess cement thereon.

Figure 14:
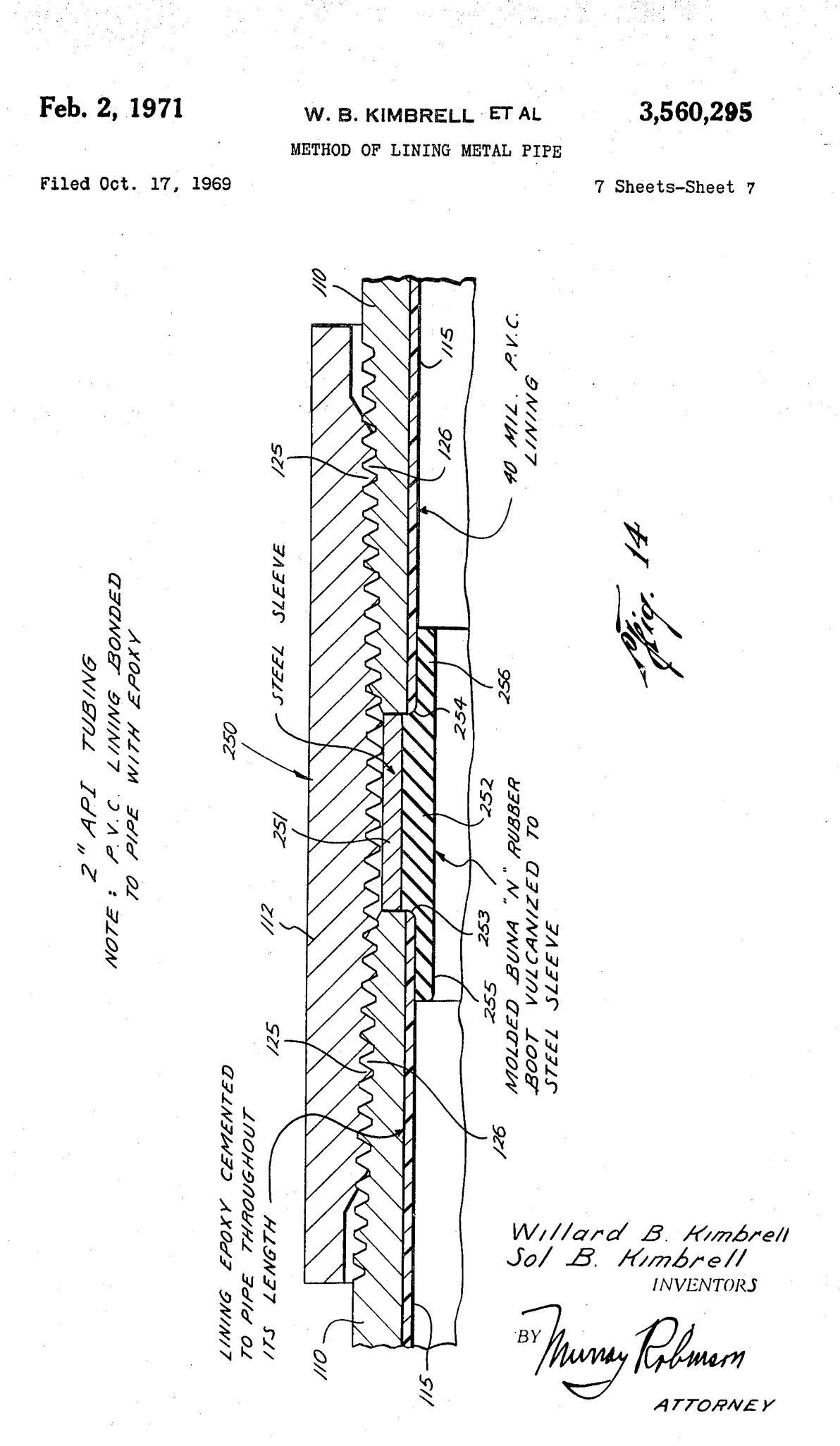

The cement from the pot 211 would normally not set up for a period of half hour or so but the high temperature created when the hot oil passes through the tube accelerates the setting of the cement so that by the time the conduit has cooled the cement has also set. A suitable inside cutter or mill can then be used at each end of the conduit to cut out the portion of the tube 115 projecting beyond the ends of the pipe, the mill cutting through flanges 116, 117 after being inserted through the enlarged bell and spigot portions 121, 120. The result is conduit such as shown in FIG. 14.

FIG. 14 also shows a special seal 250 disposed inside coupling 112. The seal 250 includes a steel sleeve 251 between the ends of pipes 110 and fitting closely inside coupling 112. A cylindrical rubber boot 252 molded, for example, of Buna N rubber, is vulcanized to the steel sleeve. The boot has shoulders 253, 254 engaging both the ends of the pipes 110 and the ends of the tubes 115 and bridging the juncture therebetween. The boot also has tubular extensions 255, 256 extending beyond the ends of the steel sleeve 251 and overlapping the tubes 115, forming lip seals therewith.

The seal 250 has the special advantage that most of the axial load thereon due to make up of the pipe and coupling is taken by the relatively rigid steel sleeve 251, preventing application of much axial load on the liner tube 115, which, if overloaded, would wrinkle and come loose. The pipe and coupling can be made up tight enough to place the steel sleeve 251 in axial compression, thereby placing axial stress on the flanks of the pipe and coupling threads 126, 125 to prevent unintentional unscrewing thereof, even if the coupling is oversize relative to the pipe so that radially tight thread engagement is not achieved. The steel sleeve 251 traps the thread dope (sealant and lubricant) that would otherwise extrude out between the pipe ends inside the coupling, thereby assuring a thread seal. For this reason the seal is useful even with unlined pipe.

Preferred details pertaining to the second form of the invention and the last described modification thereof will help to give a fuller understanding of the invention.

(1) Oil.—The oil is automobile motor oil, S.A.E. 30 viscosity, having a specific heat of about 0.5.

(2) Pressure and temperature.—The oil inlet temperature to the tube is kept between 250 deg. F. and 260 deg. F. The inlet-outlet pressure differential is about one p.s.i. and an inlet pressure of from 1 to 5 p.s.i. is employed, the oil discharging to atmospheric with a few p.s.i. velocity head.

(3) Rate of heat travel.—From the time the oil is started, it is 20 seconds until the plastic tube becomes hot enough to expand to the steel pipe size at the input end. It is 15 seconds later before the plastic tube reaches the same expanding temperature at the discharge end. Since the pipe is 30 feet long, this means that the progressive expansion travels at a rate of about 2 feet per second. This gives plenty of time for the vacuum pump to remove the air as the pressure squeezes the air toward the downstream end of the pipe.

(4) Vacuum.—A vacuum of about 1 to 1.5 inches of mercury below atmospheric is employed.

(5) Processing time.—The oil flows through the PVC tube for about 1¾ minutes in the case of a 2″ diameter pipe.

(6) Cement.—The cement is an epoxy resin, obtainable from Shell Oil Co., with a hardener agent that gives a pot life of 20 minutes at 80 degrees F.

It is to be observed that the rate of travel of the progressive expansion of the tube can be varied by varying the rate of flow of the oil. This is analogous to varying the rate of entry of the lead rod into the pipe in the first form of the invention.

While preferred embodiments of the conduit and methods of making same according to the invention have been shown and described, modifications thereof can be made by one skilled in the art without departing from the spirit of the invention. That being claimed is:

1. A method of lining imperforate metal pipe with an imperforate tube of rigid thermo-plastic material having an outer diameter slightly smaller than the inner diameter of the pipe, the steps comprising:
    axially inserting the tube in the pipe while the space within the tube and the space between the tube and the pipe contains air at atmospheric pressure,
    withdrawing the air from the space between said tube and said pipe to create a vacuum therebetween while the space within the tube is still subject to atmospheric pressure,
    flowing hot oil at a temperature of the order of 285 degrees Fahrenheit through the tube starting from one end of the tube at an inlet pressure of 1–5 p.s.i. and discharging out the other end of the tube to atmospheric pressure long enough to raise the temperature of the tube progressively from the oil inlet end of the tube to the oil outlet of the tube to change the state of the tube from rigid to plastic,
    maintaining said vacuum while said tube is changed progressively into a plastic state to expand the tube outwardly toward the pipe progressively from one end of the pipe to the other end of the pipe to squeeze out residual air from between the pipe and the tube as the expansion progresses, and
    causing the tube to cool to rigidity while maintaining the vacuum until the tube cools to rigidity.

2. The method defined in claim 1 further including the step of pushing a swab through the tube to remove any oil adhered thereto and to draw cool air into the tube to speed further cooling thereof after the tube cools to rigidity.

3. The method defined in claim 1 further including the step of coating the external surface of the tube with an epoxy cement in liquid form prior to inserting the tube in the pipe so that after the tube cools to rigidity it will be cemented to the pipe.

References Cited

UNITED STATES PATENTS

| | | |
|---|---|---|
| 2,050,036 | 8/1936 | Boax et al. _ 118—Pipe & TubeD |
| 3,080,269 | 3/1963 | Pollock et al. _____ 264—94X |
| 3,175,246 | 3/1965 | Loges et al. _____ 264—92X |

FOREIGN PATENTS

| | | | |
|---|---|---|---|
| 531,102 | 10/1956 | Canada | _____ 156—287 |
| 374,842 | 6/1932 | Great Britain | _____ 264—94 |
| 807,413 | 1/1959 | Great Britain | _____ 264—269 |

OTHER REFERENCES

Modern Plastics Encyclopedia issue for 1960, vol. 37, No. 1A, September 1959, pp. 88 and 91.

ROBERT F. WHITE, Primary Examiner

J. H. SILBAUGH, Assistant Examiner

U.S. Cl. X.R.

156—294, 392; 264—89, 92, 134